E. M. HECKMAN.
HEATER FOR AUTOMOBILES.
APPLICATION FILED FEB. 3, 1919.
1,354,554.
Patented Oct. 5, 1920.
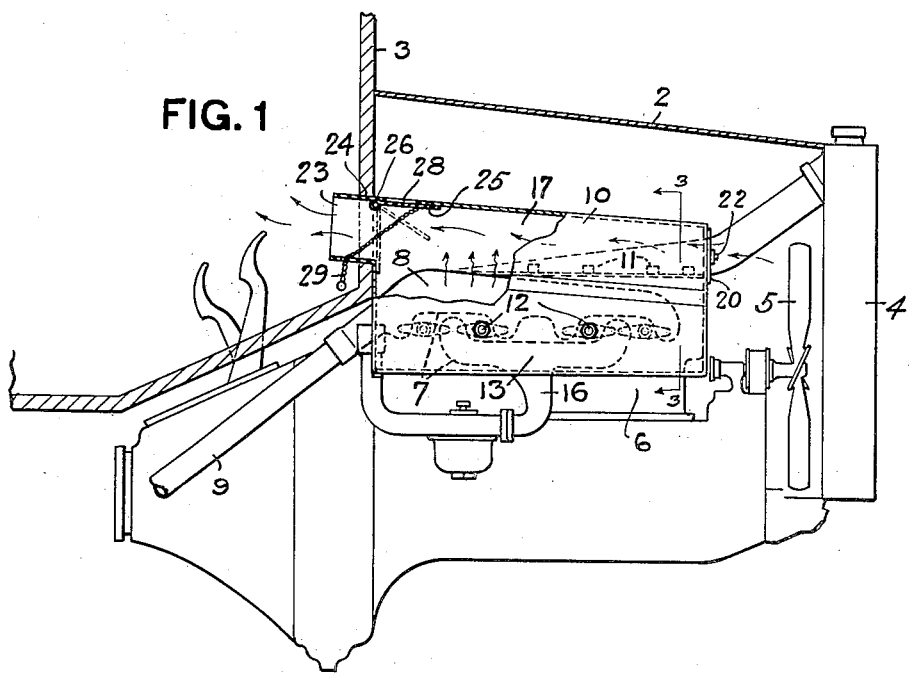
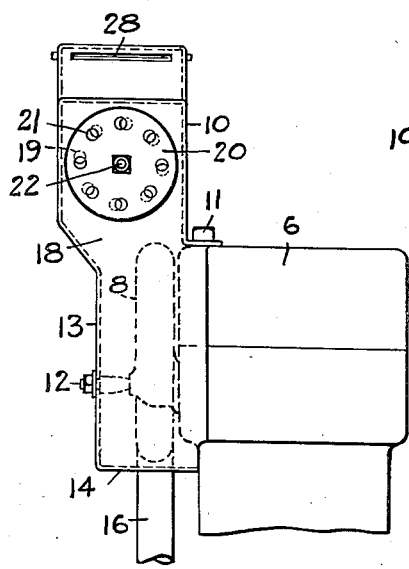
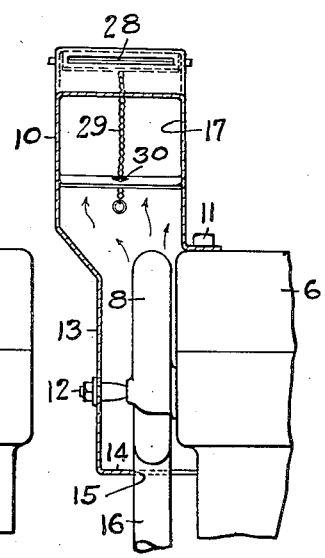
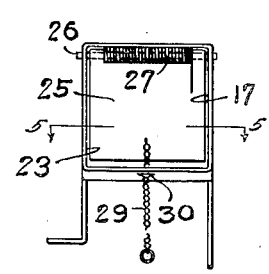
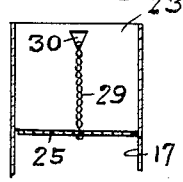
INVENTOR
Eugene M. Heckman

UNITED STATES PATENT OFFICE.

EUGENE M. HECKMAN, OF AVALON, PENNSYLVANIA.

HEATER FOR AUTOMOBILES.

1,354,554.   Specification of Letters Patent.   Patented Oct. 5, 1920.

Application filed February 3, 1919. Serial No. 274,658.

*To all whom it may concern:*

Be it known that I, EUGENE M. HECKMAN, a citizen of the United States, a resident of Avalon, in the county of Allegheny and State of Pennsylvania, have invented a new and useful Improvement in Heaters for Automobiles; and I do hereby declare the following to be a full, clear, and exact description thereof.

My invention relates to heaters for automobiles. The object of my invention is to provide a simple and efficient device for heating the interior of a motor car by making use of the heat from the exhaust manifold, so that this heat is conserved and the car may be kept comfortably heated in cold weather.

To these ends my invention comprises the novel features hereinafter set forth and claimed.

In the accompanying drawing Figure 1 is a view of a front portion of an automobile of the Ford type with the hood in section and the casing inclosing the manifold partly broken away; Fig. 2 is a front view of my improved heater as attached to the engine; Fig. 3 is an enlarged section on the line 3—3 Fig. 1; Fig. 4 is a view showing the shutter in the air passage closed; and Fig. 5 is a section on the line 5—5 Fig. 4.

In the drawings the numeral 2 designates the hood of an automobile of the Ford type, and 3 the dash-board or front of the car. The radiator 4 is of a common type, and in the rear of said radiator is the ordinary fan 5 to aid in cooling the motor.

The engine 6 is of the ordinary kind used in this type of car and is provided with the manifolds 7, one of which forms the exhaust 8 from which the exhaust pipe 9 leads back to the muffler.

A casing 10 formed of sheet metal of suitable gage is secured by bolts 11 and 12 to the engine body. This casing 10 has the skirt-portion 13 which extends down so as to inclose the entire manifold, and has the inwardly projecting flange 14 which is cut away as at 15 to receive the connection 16 leading to the manifold.

The upper end of the casing 10 has the air passage 17, said casing being so constructed that said air passage is above the manifold, so that the exhaust manifold does not extend into said passage, and accordingly said passage is unobstructed from one end to the other for the free passage of the air as will more fully hereinafter appear.

The front end of the casing 10 is closed by the front wall 18, said wall being provided with the openings 19 leading into the passage 17. A damper-plate 20 having openings 21 is mounted to turn on the pin 22, and said damper-plate working in conjunction with the openings 19, acts to control the amount of air admitted to the passage 17.

The rear end of the passage 17 communicates with the interior of the car as at 23, the forward end of said passage extending through an opening 24 in the dash-board 3.

A valve 25 is hinged at 26, said valve being actuated by the spring 27 which normally holds said valve in the raised position indicated by full lines in Fig. 1. This valve 25 when in its normal position closes the opening 28 in the passage 17. Secured to the valve 25 is the chain 29, said chain passing down through the triangular or V shaped opening 30 in the bottom of said passage at its rear end where it projects into the front part of the car. The chain is thus brought into position where it can be readily taken hold of by the driver, and the valve 25 moved and then held in any desired position by securing said chain in the apex of the triangular shaped opening 30.

When my improved heater is in use the heat radiating from the exhaust manifold rises into the unobstructed air passage 17 and the air currents entering the front end of said passage through the openings 19 and 21 will drive this heat back through the opening 23 into the front end of the car, the valve 25 being in the position shown in Fig. 1, or to close the opening 28 or may be adjusted at any position according to the temperature and amount of heat which is required to heat the car. By having the air passage 17 directly in line with the fan 5 a forced draft is always had in addition to the draft caused by the motion of the car. In case this draft is too strong the damper 20 may be moved to reduce the air inlets and in this way an accurate control of the heat may be had. By having the passage 17 entirely unobstructed there is nothing to interfere with the passage of the air in large volume, and as the heat from the exhaust naturally rises into the passage 17, this heat mixed with the incoming air is delivered directly into the car through the opening in the dash-board.

In warm weather where the heat is not required the valve 25 is closed by drawing on the chain 29 and locking said chain, so that the valve is held in the position indicated in dotted lines Fig. 1. This allows the heat collecting in the passage 17 to escape by the opening 28, and so prevents the overheating of the engine or other parts.

Where a double compartment car is used the muffler is inclosed in the manner hereinbefore described and in like manner the heat radiating from the muffler rises in the passage 35 and is driven by the air currents entering the opening 34 up through the connection 36 into the rear compartment of the car.

It will be observed that the casing 10 extends downwardly and incloses both the intake manifold 7 and the exhaust manifold 8, with the result that the heat radiated from the exhaust manifold is applied to the intake manifold whereby the temperature of the incoming fuel is raised and the efficiency of the engine thereby increased.

By my invention I provide a very simple and efficient form of heater which requires no reconstruction of the ordinary types of car, and by means of which the waste heat is conserved, while at the same time I provide means whereby the heat may be regulated and controlled to produce the desired temperature, and also provide for the cutting off of the heat and the escape of same to prevent the over-heating of the engine or other parts when heat in the car is not required.

What I claim is:

In a heater for automobiles, the combination with the engine of an exhaust manifold, a casing inclosing said manifold, said casing being provided with an unobstructed air passage at its upper portion and with fixed openings formed at its front and rear ends, a rotatable damper having an opening adapted to register with said front opening in said casing, a spring-actuated valve controlling said rear opening in said casing, the rear end of said casing extending into the interior of the automobile, and a chain connected to said valve and passing through a V-shaped opening formed in said extension.

In testimony whereof I, the said EUGENE M. HECKMAN, have hereunto set my hand.

EUGENE M. HECKMAN.

Witnesses:
H. HECK,
ROBT. D. TOTTEN.